Dec. 3, 1968   TADANOBU TAKAHASHI   3,414,275
SEALED BEARING
Filed Dec. 13, 1965   2 Sheets-Sheet 1
FIG. 1
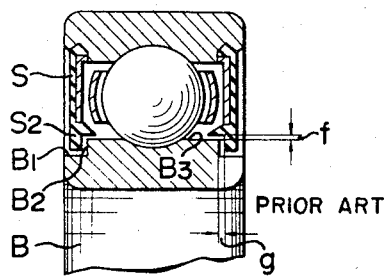
PRIOR ART
FIG. 2   FIG. 3
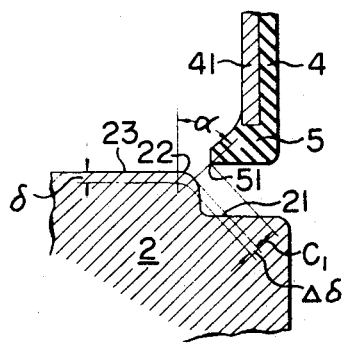   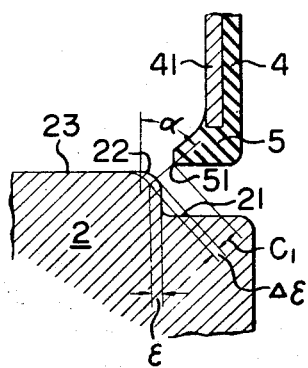
INVENTOR.
TADANOBU TAKAHASHI
BY
ATTORNEY Dec. 3, 1968  TADANOBU TAKAHASHI  3,414,275
SEALED BEARING Filed Dec. 13, 1965  2 Sheets-Sheet 2

INVENTOR.
TADANOBU TAKAHASHI
BY
ATTORNEY

United States Patent Office 3,414,275
Patented Dec. 3, 1968

3,414,275
SEALED BEARING
Tadanobu Takahashi, Fujisawa-shi, Japan, assignor to
Nippon Seiko Kabushiki Kaisha, Tokyo, Japan, a corporation of Japan
Filed Dec. 13, 1965, Ser. No. 513,278
Claims priority, application Japan, Dec. 21, 1964,
39/98,387
5 Claims. (Cl. 277—53)

ABSTRACT OF THE DISCLOSURE

This invention relates to an improved sealed bearing with a seal maintained out of contact with the inner bearing race and forming labyrinths within the sealed space between a seal lip of a seal plate and the inner bearing race, a seal step being provided at a portion of the outer surface of the inner bearing race; the seal step having a shoulder portion, and the seal lip having an edge portion, the edge portion of the seal lip and the seal step facing each other with a certain angle in the radial direction of the bearing to provide a reduced clearance between the edge portion and the seal step.

---

This invention relates to sealed bearings and more particularly to grease sealed ball bearings and the like where the seal device is maintained out of contact with the inner bearing race.

Sealed bearings are known in which the seal is maintained out of contact with the inner bearing race and in which labyrinths are formed within the sealed space formed between the conventional seals, however, labyrinths are formed between the axial surface of the seal lip and the outer surface of the inner bearing race and between the radial surface of the seal lip and a side surface of the seal step provided in the inner bearing race. Another prior known seal is disclosed in U.S. Patent No. 3,113,814, in which the seal forms labyrinths between the axial and radial inner edges of the seal and the outer surface of the inner bearing race and the groove provided in the inner bearing race, respectively. In such conventional seals, when the bearing is actuated, pressure of the grease tends to move the seal lip outwardly and downwardly thereby decreasing the labyrinth clearances formed between correspondingly faced surfaces, and accordingly, the labyrinth clearance must be precisely designed for avoiding any possibility of contacting respective facing surfaces when the bearing is used. Furthermore, working errors for the elements constituting the labyrinth directly affect the dimension of the labyrinth clearance. It follows therefore that the minimum size of the labyrinth clearance should be restricted in considering such working errors.

It is the main object of the present invention to provide a novel seal for bearings overcoming the above mentioned defects.

The seal according to the present invention comprising a seal step provided at the end portion of the outer surface of the inner bearing race, the seal step being provided with a shoulder portion, a seal plate provided with a seal lip having an edge portion at the inner periphery side of the seal plate, the edge portion of the seal lip and the seal step being faced to each other with a certain angle in the radial direction of the bearing to provide a reduced clearance between the edge portion and the seal step.

Other objects and advantages of the present invention will become apparent from the following detailed description taken in conjunction with the drawing, in which:

FIG. 1 shows a longitudinal section of a conventional sealed bearing;

FIGS. 2 and 3 are illustrative drawings of this invention showing the seal portion thereof in enlarged scale;

Figure 4:
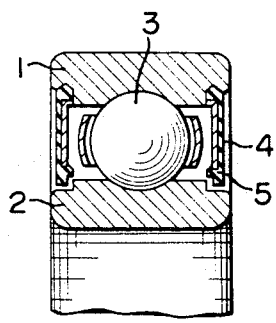
FIG. 4 shows a longitudinal section of a first embodiment, respectively.

Now referring to the drawing, FIG. 1 shows a conventional sealed ball bearing wherein the seal is maintained out of contact with the inner bearing race. In FIG. 1, the sealed construction of this bearing is formed by labyrinth clearances $f$ and $g$, which are provided between lip $S_2$ of seal plate S and outer surface $B_3$ of inner bearing race B and between lip $S_2$ and a side surface $B_2$ of seal step $B_1$, respectively. With this arrangement, working errors in the radial and axial directions of the portions of the inner bearing race and the seal plate forming the labyrinths, directly results in variation of the labyrinth clearances $f$ and $g$. The labyrinth clearances $f$ and $g$ are thus limited due to unavoidable working errors. For this reason it is difficult to prevent sealing grease from flowing out of and the dust from entering into the bearing. If the labyrinth clearance is made too small, there the seal lip contacts the inner bearing race to produce frictional heat when the bearing rotates.

The present invention overcomes the above defects, and an embodiment thereof illustrated in FIGS. 2 and 3 shows a seal step 21 provided at the end of outer surface 23 of inner bearing race 2, and shoulder portion 22 is formed at a transition portion of outer surface 23 and seal step 21. Seal lip 5 having edge portion 51 is formed at the inner peripheral side of seal plate 4. Edge portion 51 faces the shoulder 22 of seal step 21 with an angle $\alpha$ in the radial direction of the bearing and a reduced clearance $C_1$ is formed in the direction of the angle $\alpha$. Reduced clearance $C_1$ is the minimum distance between edge portion 51 and shoulder 22.

With this arrangement, when a working error $\delta$ occurs in the radial direction as shown in FIG. 2 with respect to the outer surface 23 of inner bearing race 2, variation $\Delta\delta$ of reduced clearance $C_1$ is calculated as $\Delta\delta = \delta \cdot \cos \alpha$, and with a working error $\epsilon$ in the axial direction as shown in FIG. 3, variation $\Delta\epsilon$ of reduced clearance $C_1$ is calculated as $$\Delta\epsilon = \epsilon \cdot \sin \alpha$$

Since angle $\alpha$ is selected to be $0 < \alpha < 90°$, the values of both $\cos \alpha$ and $\sin \alpha$ are less than 1, it is apparent that $\Delta\delta$ and $\Delta\epsilon$ are less than $\delta$ and $\epsilon$, respectively, and the value of reduced clearance $C_1$ changes by an amount less than the value of working error. Accordingly, the value of the clearance $C_1$ of the present invention can be made smaller than that obtainable by the conventional labyrinth clearance.

In the embodiments illustrated in FIGS. 4 through 7, an outer race 1 and an inner race 2 are provided for ball 3, the inner race being formed with the seal step 21. A seal plate 4 having a seal lip 5 at the inner periphery is also provided for the bearing. An angle $\alpha$ is formed between the edge portion 51 of the seal lip 5 and the shoulder 22 of the seal step 21. Labyrinth clearance $C_2$ is formed between the lip 5 and the outer surface of seal step 21.

Figure 5:
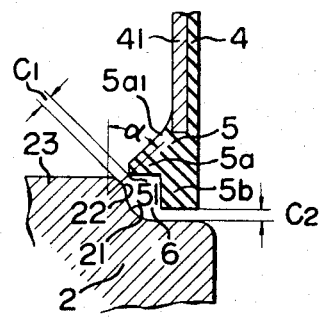
FIG. 5 shows the seal portion of the first embodiment in enlarged scale.

FIG. 5 shows one embodiment of this invention. The seal lip of the seal plate is divided into axial and radial lip portions and forms an L-shaped step facing the outer edge surface of the inner bearing race. Seal plate 4 comprises an elastic body reinforced by a metal ring 41, an axial lip 5a having a surface 5a, inwardly sloped so that an extension of the surface would intersect the outer surface 23 of the inner bearing race, and a vertically extended radial lip 5b. Edge portion 51 of axial lip 5a and shoulder 22 formed by L-shaped seal step 21 provided on the outer surface of inner bearing race 2 face each other to the form reduced clearance $C_1$. Radial lip 5b forms a labyrinth clearance $C_2$ between the inner surface thereof and seal step 21. The space 6 formed between reduced clearance $C_1$ and labyrinth clearance $C_2$ serves as grease pocket. According to this construction, very effective seal is obtained. Furthermore, when the bearing rotates, the flow of grease is circulated from the outer bearing race side to the inner bearing race side guided the inwardly sloped surface $5a_1$ of axial lip 5a.

Figure 6:
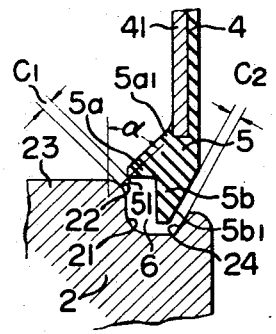
FIGS. 6 and 7 show longitudinal sections in enlarged scale of the seal portion of a second and third embodiment, respectively.

FIG. 6 shows another embodiment where an outer surface $5b_1$ on the radial lip 5b is inclined radially while the seal step 21 is formed with a U-shaped groove when viewed in cross-section having a radially inclined surface 24 substantially parallel with the surface $5b_1$ and spaced therefrom to form a clearance $C_2$. A grease pocket 6 is formed between the two clearances $C_1$ and $C_2$. The clearance $C_1$ is disposed at an angle $\alpha$ as in the previous embodiment. With the present embodiment, a more effective seal is obtained due to the insertion of the radial lip 5b with clearance within the U-shaped groove of the seal step 21, and to the labyrinth clearance $C_2$ formed between the sloped surfaces $5b_1$ and 24.

Figure 7:
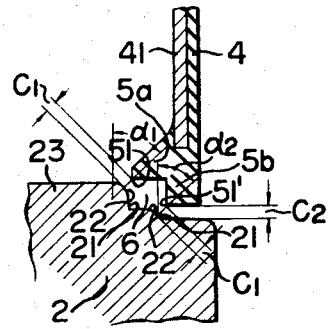

FIG. 7 shows still another embodiment, where the seal step of the inner bearing race is provided with more than one shoulder, thus more than one reduced clearance is obtained between the corresponding shoulders and the edge portions of the seal lip. The seal lip of seal plate 4 consists of the axial lip 5a and the radial lip 5b, the edge portions 51 and 51' of respective lips 5a and 5b facing the shoulders 22 and 22', respectively, with angles $\alpha_1$ and $\alpha_2$ and forming reduced clearances $C_1$ and $C_1'$, while the inner surface of radial lip 5b and a shallow step 21' at the outer end portion of the inner bearing race from labyrinth clearance $C_2$. In the third embodiment, two reduced clearances and one labyrinth clearance and grease pocket are provided to obtain the most effective seal.

As hereinbefore described, in accordance with the present invention, working errors have less effect on the labyrinth clearances than in prior art bearings making it possible to provide bearings having reduced clearances which are effective against the leakage of grease and the entrance of dust. Furthermore, since the reduced clearance $C_1$ is formed between the edge portion of the lip and the shoulder, axial lip 5a never contacts the shoulder when the lip 5a is pushed outwardly by the pressure of grease produced by the rotation of the bearing. The value of $\alpha$ is selected within the range of $0 < \alpha < 90°$ to easily work the inner bearing race and the seal plate.

What is claimed is:

1. A sealed bearing with a seal maintained out of contact with the inner bearing race and forming labyrinths within the sealed space, comprising inner and outer concentric bearing races, at least one seal step provided at a portion of the outer surface of the inner bearing race, the seal step forming a shoulder portion, and a seal plate, the seal plate provided with a seal lip having at least one edge portion, the edge portion of the seal lip and the seal step facing each other at an angle selected from the range of 0° to 90° in the radial direction of the bearing to provide a first labyrinth clearance, the seal lip consisting of an axial lip and a radial lip which is L-shaped in cross section to form a grease pocket between the seal lip and the seal step, the axial lip is formed with an inner sloped surface and the radial lip extends straight in the axial direction, the clearance being formed between the edge portion of the axial lip and the shoulder portion of the seal step, a second labyrinth clearance being formed between the inner surface of the radial lip and the seal step.

2. A sealed bearing according to claim 1, in which the radial lip is provided with a sloped outer surface, the seal step being formed with a U-shaped groove in cross section having a surface sloped parallel with the sloped outer surface of the radial lip to provide said second labyrinth clearance therebetween.

3. An improved sealed bearing with a seal maintained out of contact with an inner bearing race and forming labyrinths within the sealed space formed between a seal lip of a seal plate and the inner bearing race, the improvement comprising a shoulder portion on the inner bearing race formed with a seal step extending radially to form a groove at the end portion of the outer surface of the inner bearing race, an axial lip formed on the seal plate having an inner surface inwardly sloped, an extension of which would intersect the outer surface of the inner bearing race, a radial lip on the seal plate extending radially toward the outer surface of the inner bearing race, the radial lip forming a labyrinth clearance between the same and the outer surface of the inner bearing race, the edge portion of the axial lip facing the shoulder portion of the seal step of the inner bearing race with an angle to form a clearance therebetween, and a grease pocket formed between the labyrinth clearance and the clearance at a space defined by the axial lip and the radial lip and the groove of the inner bearing race, the axial lip and the radial lip maintaining their respective positions not to contact the inner bearing race while the bearing is rotating.

4. An improved sealed bearing according to claim 3, in which the seal step of the inner bearing race is in the form of an L-shaped step, the labyrinth clearance being formed between the radial lip and the outer surface of the L-shaped step.

5. An improved sealed bearing according to claim 3, in which the seal step of the inner bearing race is a U-shaped groove, the labyrinth clearance being formed between the outer surface sloped inwardly of the radial lip and the corresponding inwardly sloped inner surface of the U-shaped groove of the inner bearing race.

References Cited

UNITED STATES PATENTS 3,113,814   12/1963   Ogura _____ 277—53 X
3,262,635   7/1966   Smuland _____ 277—56 X

FOREIGN PATENTS 1,008,061   5/1957   Germany.

SAMUEL ROTHBERG, *Primary Examiner.*